Jan 6, 1931.  A. C. WILCOX  1,787,460
METHOD AND MEANS FOR FORMING GLASS ARTICLES
Filed Aug. 16, 1929
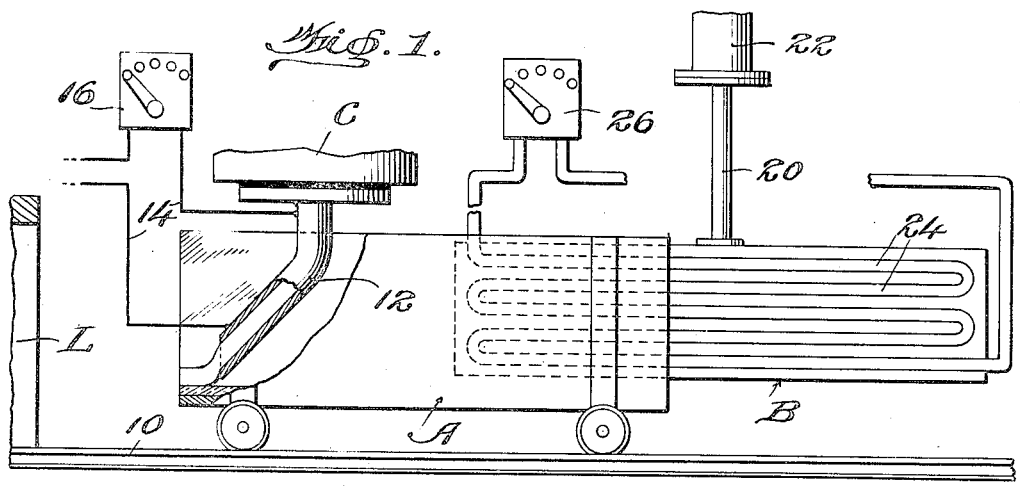
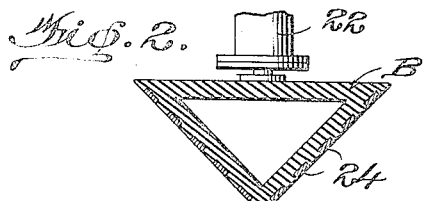
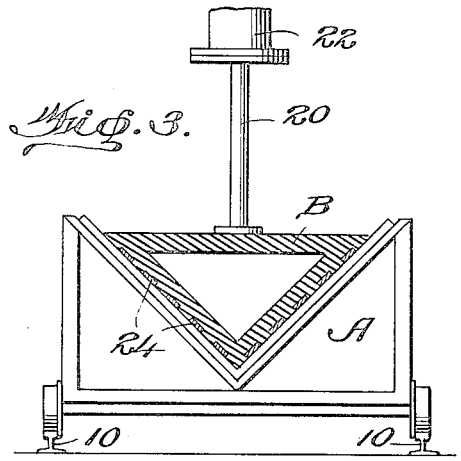
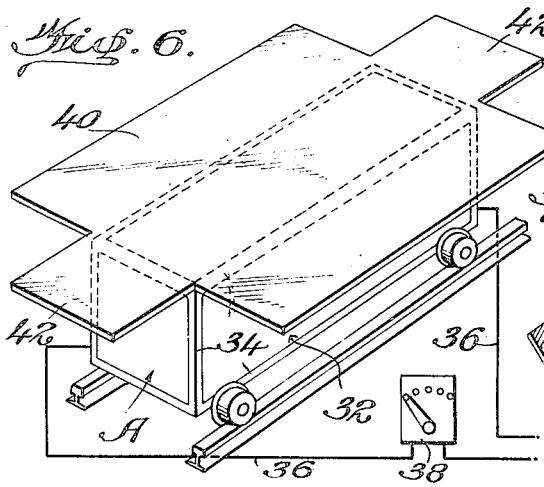
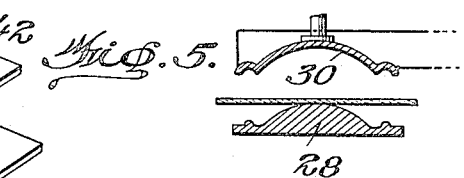
Inventor
A. C. Wilcox,
by Carroll Bailey
Attorney Patented Jan. 6, 1931

1,787,460

UNITED STATES PATENT OFFICE

ALBERT C. WILCOX, OF BRIDGEPORT, OHIO

METHOD AND MEANS FOR FORMING GLASS ARTICLES

Application filed August 16, 1929. Serial No. 386,454.

My present invention relates to a method and means for forming glass articles, and my purpose, generally speaking, is to provide a method and means whereby various glass articles having a form rendering them exceedingly difficult if not impossible of being formed by the employment of known methods and apparatus, may be produced rapidly, accurately, and at comparatively low cost.

With the foregoing general purpose in view, my invention consists in the novel method and in the novel features of construction, combination and arrangement of parts of my apparatus as will be hereinafter more fully described, illustrated in the accompanying drawings and defined in the appended claims.

In the drawings, wherein like characters of reference denote corresponding parts in the different views:

Fig. 1, is a side elevation of a glass article forming apparatus embodying the novel and essential features of my invention.

Fig. 2, is a transverse sectional view through the apparatus shown in Fig. 1, illustrating the initial step in forming a glass article in accordance with my invention.

Fig. 3, is a view similar to Fig. 2, illustrating the second step in forming a glass article in accordance with my invention.

Fig. 4, is a detail perspective view illustrating the third step in forming a glass article in accordance with my invention.

Fig. 5, is a view similar to Figs. 2 and 3, illustrating one of many shapes in which certain elements of my apparatus may be formed; and Fig. 6, is a diagrammatic perspective view illustrating a slight modification of the apparatus disclosed in Figs. 1 to 5.

According to my present invention, I propose to form glass articles either by joining together in a novel manner separate pieces of glass previously formed to desired size and shape, or by bending a single piece of glass into desired shape and adding glass thereto to produce the article desired.

One practicable mechanism usable to practice my invention as generally outlined in the foregoing, consists, as illustrated in Figs. 1 to 3 of the drawings, of a suitable glass article supporting and moving means A, a cooperating forming element B, and a source of molten glass C.

The glass article supporting and moving means A consists, in this instance of a wheeled car mounted on track rails 10 for travel beneath the source of molten glass C, while the latter consists of a molten glass container having a downwardly directed molten glass discharge spout or nozzle 12.

The nozzle 12 is formed from a suitable electrical resistance material adapted to be electrically heated to control the temperature of the glass flowing therethrough independently of the means for maintaining the glass in a molten condition at its source, and to this end said nozzle has suitably connected therewith conductors 14 leading from a suitable source of current, one of said conductors being inclusive of a rheostat 16 whereby the temperature of the nozzle, and consequently the temperature and viscosity of the glass flowing therethrough, may be accurately regulated.

With an arrangement as described, two or more pieces of glass may be placed in the car A in a desired relation in which they are to be joined together, and heated to render them sufficiently viscid at least adjacent to their edge or other portions to be joined together, so that if molten glass is deposited on their heated, viscid portions, it will unite therewith and form a homogeneous joint or connection. Thus, by moving the car at a proper rate of speed beneath the tank C and by allowing molten glass at a proper temperature to flow from the nozzle 12 onto the adjacent portions of two or more pieces of heated glass carried by the car, practically any desired article may be formed from two or more properly shaped pieces of glass, or reinforcements or other additions of glass may be supplied to a piece or pieces of heated glass carried by the car, irrespective of whether said piece or pieces of glass are or are not to be joined together, this being evident from a consideration of Fig. 4 of the drawings wherein is illustrated a single sheet having angularly related sides $a$, $a$ supplied with a reinforcing fillet 18 of glass at their junction in accordance with the foregoing process. While any suitable form of glass tank C may be used, I preferably employ a tank with a separate compartment to which the nozzle 12 is connected as illustrated in my copending application, 386,453, filed of even date herewith, whereby I may accurately regulate the flow of molten glass from said nozzle by regulating the air pressure which forces the glass through said nozzle, all as fully set forth in said copending application.

The piece or pieces of glass to which molten glass is adapted to be supplied by means of the nozzle 12, may be initially heated and shaped in any desired manner, and then placed in the car A for movement beneath the nozzle, or in lieu of the car A any other suitable means may be employed for moving the piece or pieces of glass beneath said nozzle. It is practicable, however, to utilize the car A or its equivalent as one element of a two part mold so that the piece or pieces of glass may be heated and shaped while carried by the car, thereby to eliminate difficult handling of the piece or pieces of glass, especially after heating. Thus, as illustrated in Figs. 2 and 3, the car may, for example, have a V-shaped cross section for cooperation with the heating and forming member B constituting the second element of the mold. This member B is suitably mounted, as, for example, by being suspended from the piston rod 20 of an air cylinder 22, so that it is adapted to be raised and lowered, and it is disposed above the track rails 10 whereby the car A is adapted to travel therebeneath. As shown, said member has a V-shaped cross section to fit the section of the car A, and its body, which is formed from any suitable heat resisting, electrical insulation material, has mounted on or embedded in its sides suitable electrical resistance coils or equivalent elements 24 connected through a rheostat 26 with a source of current. Thus, for example, by supporting a flat sheet of glass across the upper edges of the car A, as illustrated in Fig. 2 of the drawings, and by moving the car A with the sheet of glass thereon beneath the heating and forming element B, if it is not already disposed beneath said element with the latter in an elevated position, and by then including the coils 24 in circuit with the source of current and admitting air to the cylinder 22 to move the member B slowly downward, the glass sheet will be heated by said coils and at the same time pressed into the V-shape shown in Figs. 3 and 4 of the drawings. Thereupon, the heating and forming member may be slightly elevated out of contact with the sheet to permit the latter to be moved beneath the nozzle 12 to have molten glass supplied at the bend in the sheet to reinforce same in the manner previously set forth, current preferably being maintained flowing through the coils 24 as the car is moved from beneath the member B whereby successive portions of the sheet approaching the nozzle 12 are maintained in a desired heated, viscid condition accurately controllable by the rheostat 26 as is obvious.

In view of the foregoing it is apparent that by providing cars A and members B of different shapes, a sheet or sheets or other piece or pieces of glass may be heated and bent into practically an unlimited number of different forms, each of which may have additional glass supplied thereto by means of nozzle 12 for any desired purpose. Thus, as indicative by way of example of another form in which the car A and the member B may be embodied, attention is called to Fig. 5 of the drawings which indicates that the car A may be inclusive of a convex mold element 28 and that the member B may be inclusive of a cooperating concave mold element 30, which itself may constitute an electrical resistance device instead, as shown in Figs. 1 to 3, of being formed of insulation and carrying heating coils.

Of course, either the member B or the car A or its equivalent, or both the latter and said member B, may have electrical heating means associated therewith. It is considered to be ample and most practicable, however, to have the electrical heating means for the mold carried only by the member B.

Referring now to Fig. 6 of the drawings, A' designates a car which may be formed wholly of electrical resistance material, or in part of insulation and in part of electrical resistance material. In the present instance said car is illustrated as of the latter construction, same including a rectangular body 32 of insulation equipped at its corners with electrical resistance strips 34 included in circuit through conductors 36, and a rheostat 38, with a source of current. According to this form of my invention the heating and forming element B is dispensed with, the sheet or sheets or other piece or pieces of glass to be heated and bent to shape being adapted to be placed on the top of said car so as to take the shape thereof, or a part thereof, under the influence of gravity when the glass is softened by heat from the body 32 or the strips 34.

Thus, as illustrated in Fig. 6, by placing a sheet of glass 40, cut to the shape of a rectangle of proper size with tongues 42 extending from its ends, upon the top of the body 32 and including the heating strips 34 in circuit with the source of current, the sheet will be heated along lines extending between the side edges of the tongues 42 and across said tongues at the junction with the sheet proper, and as the glass of the sheet becomes soft along these lines, the sides and the end tongues 42 of the sheet will fold downwardly under the influence of gravity, whereby the sheet will take the form of a box with ununited corners. By then moving the car A' beneath the nozzle 12, and, if necessary, by manipulating the partly formed box to bring its corner portions into position to have molten glass supplied thereto from said nozzle, said corners may be supplied with connecting and reinforcing fillets of glass in the manner heretofore set forth. Obviously, by providing cars A' or their equivalent of different sizes and shapes, articles of innumerable sizes and shapes may be produced, either in a single operation or by a process of forming different parts of a desired article and thereafter uniting the separately formed parts, as, for example, by forming a box without ends in one operation, forming the ends of the box of any desired shape in another operation, and joining the ends with the body of the box in still another operation.

At L in Fig. 1 of the drawings is indicated a lehr into which the car A or A' is adapted to be moved to enable annealing of an article carried thereby upon completion of the operations of forming the article.

From the foregoing description considered in connection with the accompanying drawings, it is believed that the construction, operation and advantages of my apparatus, as well as the manner of practicing my method will be clearly understood. I desire to point out, however, that my method is capable of being practiced by employing apparatus differing in many respects from the particular apparatus herein disclosed. I would therefore have it understood that I consider as within the spirit and scope of my invention all such alternative embodiments of the general apparatus and method herein disclosed as fall within the terms of the appended claims.

I claim:

1. The method of forming glass articles which consists in heating a glass blank or blanks to render same at least in part sufficiently viscid to enable molten glass to unite therewith and become part thereof and to enable the blank or blanks to be bent to desired shape, bending the blank or blanks to shape, and supplying molten glass to viscid portions of the blank or blanks at desired points.

2. The method of forming glass articles which consists in heating a glass blank to render same at least in part sufficiently viscid to enable molten glass to unite therewith and become part thereof, and supplying molten glass to a viscid portion of the blank.

3. The method of forming glass articles which consists in applying heat to a glass blank and changing the shape thereof, and supplying molten glass at desired points to the blank of changed shape.

4. Glass article forming apparatus comprising a source of molten glass having glass delivery means, an article carrying member movable beneath said glass delivery means whereby an article carried thereby is adapted to receive molten glass from said glass delivery means, and means for heating and shaping an article carried by said member.

5. Glass article forming apparatus comprising a source of molten glass having glass delivery means, electrical means for heating and regulating the heat of said delivery means, an article carrying member movable beneath said glass delivery means, and means for heating and shaping a glass article carried by said member.

6. Glass article forming apparatus comprising a source of molten glass having glass delivery means, a glass article heating and forming member and glass article supporting means movable between a position to have a glass article supported thereon heated and formed by said member and a position in which the heated and formed article is adapted to have molten glass supplied thereto from said glass delivery means.

7. Glass article forming apparatus comprising a source of molten glass having glass delivery means, an elevatable and depressible heating and forming element, a glass article supporting member movable beneath said heating and forming element when same is elevated whereby a glass article supported on such member is adapted to be heated by said element and shaped thereby when same is depressed, said supporting member being movable beneath said glass delivery means, and means for maintaining a constant temperature of said heating forming element.

8. Glass article forming apparatus comprising a source of molten glass having glass delivery means, rheostat controlled electrical means for heating said delivery means, a two part mold one part of which constitutes a glass article supporting element movable relatively to said glass delivery means whereby a glass article supported thereon is adapted to be supplied with glass from said means, the other part of said mold being constituted by an element movable with respect to said first mold element when the latter is stationary to heat and shape a glass article supported by said first mold element, and rheostat controlled electrical means for heating said second mentioned mold element.

9. Glass article forming apparatus comprising a source of molten glass having glass delivery means, an elevatable and depressible heating and forming element, a car adapted to support a glass article, said car being mounted for movement to and from a position beneath said heating and forming element to a position beneath said glass delivery means.

10. Glass article forming apparatus comprising source of molten glass having glass delivery means, a member upon which an article blank is adapted to be placed, said member being movable to a position to have glass supplied from said delivery means to an article blank supported on said member, and means for electrically heating portions at least of said member to cause portions of an article blank supported thereon to be heated and assume the shape of a portion at least of said member under the influence of gravity.

In testimony whereof I hereunto affix my signature.

ALBERT C. WILCOX.